(12) United States Patent
Kolhi et al.

(10) Patent No.: US 8,559,448 B2
(45) Date of Patent: Oct. 15, 2013

(54) METHOD AND APPARATUS FOR COMMUNICATION OF DATA PACKETS BETWEEN LOCAL NETWORKS

(75) Inventors: Johan Kolhi, Vaxholm (SE); Christian Gotare, Getinge (SE); Tomas Thyni, Jarfalla (SE); Annikki Welin, Solna (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 216 days.

(21) Appl. No.: 12/922,946

(22) PCT Filed: Mar. 20, 2009

(86) PCT No.: PCT/SE2009/050297
§ 371 (c)(1),
(2), (4) Date: Sep. 16, 2010

(87) PCT Pub. No.: WO2009/116948
PCT Pub. Date: Sep. 24, 2009

(65) Prior Publication Data
US 2011/0026537 A1 Feb. 3, 2011

Related U.S. Application Data

(60) Provisional application No. 61/038,192, filed on Mar. 20, 2008.

(51) Int. Cl.
*H04L 12/56* (2011.01)
*G06F 15/16* (2006.01)
*H04L 12/28* (2006.01)
*H04L 29/06* (2006.01)

(52) U.S. Cl.
CPC ..................................... *H04L 29/06* (2013.01)
USPC .......................................... 370/401; 709/245

(58) Field of Classification Search
USPC ............ 709/15, 238, 245–249; 370/401, 466; 726/3
See application file for complete search history.

(56) References Cited

U.S. PATENT DOCUMENTS

| | | | |
|---|---|---|---|
| 6,493,765 B1 | 12/2002 | Cunningham et al. | |
| 2003/0158962 A1 | 8/2003 | Keane et al. | |
| 2003/0163722 A1* | 8/2003 | Anderson, IV | 713/200 |
| 2003/0172184 A1* | 9/2003 | Kong | 709/245 |
| 2004/0148439 A1 | 7/2004 | Harvey et al. | |
| 2004/0218611 A1* | 11/2004 | Kim | 370/401 |
| 2005/0076142 A1 | 4/2005 | Chin | |

* cited by examiner

*Primary Examiner* — Wing F Chan
*Assistant Examiner* — Raji Krishnan
(74) *Attorney, Agent, or Firm* — Coats and Bennett, P.L.L.C.

(57) ABSTRACT

Method and arrangement for communication of data packets between a first device (D1) in a first local network (A) and a second device (D2) in a second local network (B). where private IP addresses are used for devices present in the first and second local networks. A first gateway (100) of the first network updates (1:1) a local name server record (100a) with a domain name and an IP address of a second gateway (102) of the second network, each gateway having a local DNS function. When an outgoing DNS request is received (1:2) from the first device referring to a hostname of the second device, the IP address of the second gateway is determined (1:3) from the local name server record based on a domain name in the hostname. A DNS request is then sent (1:4) to the second gateway using the determined IP address, to obtain a current private IP address of the second device in a DNS response (1:5) from the second gateway. A DNS response is then forwarded (1:8) to the first device, referring to the current private IP address of the second device.

13 Claims, 3 Drawing Sheets

METHOD AND APPARATUS FOR COMMUNICATION OF DATA PACKETS BETWEEN LOCAL NETWORKS

TECHNICAL FIELD

The invention relates generally to a method and apparatus for enabling communication of data packets between communication devices located within different local networks which could use overlapping address spaces.

BACKGROUND

Packet-based transmission of digitally encoded information between different parties over IP (Internet Protocol) networks is used for a variety of communication services, such as e-mail messaging, file transfers, Internet browsing, voice and video telephony, content streaming, games, and so forth. Digitally encoded information is arranged into data packets at a sending party which then transmits the packets towards a targeted receiving party over a transmission path. A data packet is basically configured with a data field containing payload data and a header field containing a destination address of the receiving party and a source address of the sending party.

Data packets may be communicated between various communication devices located within different local or private networks where each network employs a gateway for receiving packets to the devices from sources outside the network, and also for sending packets from the devices to destinations outside the network. The packets communicated between such devices in different local networks are then transported between the respective network gateways over a public IP network, such as the Internet.

In this description, the term "local network" is used to generally represent any network using internal private addressing and a gateway for external communication with parties outside the network. Other commonly used equivalent terms include "private network", "residential network" and "home network". Further, a "gateway" could be a residential gateway (RGW), an IP router or any other type of network entity capable of communicating data packets between a device within a local network and an entity outside the network. The term "device" is further used here to represent any terminal, computer, telephone or server capable of communicating data packets with other devices.

Since communication over public IP networks is generally deemed "unsafe" with respect to data protection and privacy, it is desirable to protect payload data and other sensitive information in the packets from illicit interception or manipulation. One way of overcoming this problem is to establish a VPN (Virtual Private Network) tunnel between the communicating parties over the public IP network.

A VPN can be seen basically as an encrypted tunnel through a public IP network, for transferring data packets between terminals and servers. VPNs are commonly used for secure communications through the public Internet. Various QoS (Quality of Service) parameters may be defined for a VPN to achieve expected behaviour between a VPN customer and a VPN service provider. Generally, a VPN may be established for two or more communication devices in a user community to provide a certain functionality that is in some respect relevant to that community.

As the popularity and usage of the Internet grows, it becomes increasingly desirable to extend private and local networks across the Internet as well. For example, many companies and enterprises having a local network establish their own VPNs to allow their employees to access the local network remotely.

A VPN can thus be seen as a logical and "distributed" local network running over a public network infrastructure. These networks make use of a range of technologies to obtain traffic privacy, traffic separation and QoS of the data. A VPN can be established over an intranet, the Internet or a service provider's network infrastructure. There are generally two basic types of VPN services available referred to as "Access VPNs" and "LAN (Local Area Network)-to-LAN VPNs", the former being used for remote access and the latter when different local networks are interconnected to provide an intranet or extranet.

Devices within local networks typically use IP-addresses from a private address space, where such private IP addresses can be freely assigned to devices internally by a local administrator or the like. The used private IP-addresses are thus basically unknown to other users, unless explicitly told, and also to the Internet service provider providing public IP-addresses to subscribers.

Today, these private address spaces are generally re-used in multiple local networks, and therefore the private IP-addresses used by different local networks for their devices may overlap with each other, in particular the commonly used IPv4-based private address spaces. For example, the private IP address used by a device in one local network may be the same address as the one used by another device in another opposite local network, resulting in ambiguous addressing in communicated data packets. Due to such overlapping or re-used private address spaces and local assignment to devices, private IP addresses are effectively "unroutable" in the public Internet, and public IP addresses must therefore also be used in the packets since private IP addresses are not used for routing outside the local network domain.

A remaining problem is however that a packet sending device in one local network must include a private IP address of a receiving device in the opposite local network, which requires some suitable functionality at the sending device for proper identification of the receiving device. Furthermore, if dynamic address assignment is used for the devices within the local networks, the private IP address of a particular device will be changed from time to time. Thus, it could be rather difficult to maintain knowledge at the local devices of such address changes at the opposite network to provide a proper destination address in outgoing packets.

SUMMARY

It is an object of the invention to address at least some of the problems outlined above. It is also an object to provide a mechanism for obtaining a destination address for communicating a data packet from a first device in a first local network to a second device in a second local network, without requiring that the sending device or its user has knowledge of what private IP address is currently valid for the second device.

According to different aspects, a method, an arrangement in a gateway, a computer program and a computer program product are provided to enable communication of data packets between a first communications device in a first local network and a second communications device in a second local network, wherein private IP addresses are used for devices present in the first and second local networks.

In one aspect, a method is provided in the first gateway where a local name server record in the first gateway is updated with a domain name and an IP address of a second gateway of the second network, each gateway having a local DNS function. When the first gateway receives an outgoing DNS request from the first device referring to a hostname of the second device, the IP address of a primary DNS being the second gateway is determined from the local name server record based on a domain name in the hostname. A DNS request is then sent to the second gateway, using the determined IP address, to obtain a current private IP address of the second device in a DNS response from the second gateway. A DNS response is also forwarded to the first device, referring to the current private IP address of the second device.

In another aspect, an arrangement is provided in a first gateway which serves the first local network. The gateway arrangement comprises a name server record manager adapted to update a local name server record with a domain name and an IP address of a second gateway of the second network, where each of the first and second gateways has a local DNS function. The gateway arrangement also comprises an internal communication unit adapted to receive from the first device an outgoing DNS request referring to a hostname of the second device. The gateway arrangement also comprises a DNS determining unit adapted to determine the IP address of a primary DNS being the second gateway, from the local name server record based on a domain name in the hostname.

The gateway arrangement also comprises an external communication unit adapted to send a DNS request to the second gateway, using the determined IP address, and to obtain a current private IP address of the second device in a DNS response from the second gateway. The internal communication unit is further adapted to forward a DNS response to the first device referring to the current private IP address of the second device.

In yet another aspect, a computer program is configured for a first gateway that serves a first local network. The computer program comprises code means which when run on the first gateway causes the first gateway to update a local name server record with a domain name and an IP address of a second gateway of the second network, where each of the first and second gateways has a local DNS function. The code means also causes the first gateway to receive from the first device an outgoing DNS request referring to a hostname of the second device, and to determine the IP address of a primary DNS being the second gateway, from the local name server record based on a domain name in the hostname.

The code means also causes the first gateway to send a DNS request to the second gateway, using the determined IP address, to obtain a current private IP address of the second device in a DNS response from the second gateway, and to forward a DNS response to the first device, referring to the current private IP address of the second device.

In yet another aspect, a computer program product comprises the computer program above and a computer readable medium on which the computer program is stored.

Each of the above method, gateway arrangement, computer program and computer program product may further comprise features and functions configured according to the following embodiments.

For example, if the private IP addresses used for devices in the first and second local networks are potentially overlapping and the obtained private IP address is used in the second network for the second device, the obtained private IP address is translated to a modified private IP address used in the first network for the second device. The modified private IP address is then within an address space defined for a VPN tunnel between the first and second networks and being separate from, i.e. non-overlapped with, an internal IP address space used in the first local network for devices in the first local network. The DNS response would then comprise the modified IP address.

The modified private IP address may be an IPv4-based address where a unique number in a second or third octet has been allocated to represent the second local network.

The DNS response from the second gateway may further contain a time-out parameter which determines a validity duration for the current private IP address of the second device. In that case, the current private IP address of the second device may be temporarily cached in the first gateway according to the time-out parameter.

The hostname may include a first part identifying the second device and a second part with the domain name. Further, the VPN tunnel may have been established for data packet communication between the first and second gateways, and a public IP address may have been assigned to each gateway.

Further possible features and benefits of the invention will become apparent from the detailed description below.

BRIEF DESCRIPTION OF THE DRAWINGS

The invention will now be described in more detail by means of exemplary embodiments and with reference to the accompanying drawings, in which.

DETAILED DESCRIPTION

The invention provides a mechanism for obtaining a useful destination address for communicating a data packet from a first device in a first local network to a second device in a second local network, without requiring that the sending device or its user has knowledge of what private IP address is currently valid for the second device. This mechanism is useful, e.g., when potentially overlapping address spaces are used in the first and second networks which may require address translation to ensure unambiguous addressing of packets within the networks, and particularly when private IP addresses are assigned to local devices on a dynamic basis such that the individual devices change their addresses frequently.

In this solution, the first device can simply refer to a hostname of the second device in an outgoing DNS request, which is then sent from a first gateway of the first network to a second gateway of the second network, each gateway having a local DNS function for handling DNS requests. The first gateway then receives a DNS response from the second gateway containing the currently valid private IP address of the second device used in the second network, and a DNS response referring to that address is also forwarded to the first device. Thereby, the first device is able to get across data packets to the second device using the currently valid private IP address of the second device as a destination address in a header field of the packet.

The IP address in the DNS response is thus used in the second network for the second device, and can also be used in the first network if it is known that the address space used in the second network does not overlap with the address space used in the first network. In that case, the DNS response to the first device includes the received IP address "as is".

On the other hand, if potentially overlapping address spaces are used for devices in the first and second local networks, the first gateway preferably translates the received private IP address into a private IP address used in the first network for the second device and which is separate from, i.e. non-overlapping with, the private IP address space used for the local devices within the first network. In that case, the DNS response to the first device includes the translated IP address.

An example of how the above can be accomplished will now be described with reference to a communication scenario shown in FIG. 1. A first gateway 100 and a second gateway 102 are shown serving first and second networks A and B, respectively, where a plurality of devices are present including a first device D1 in network A and a second device D2 in network B. It is assumed that a private address space is used in each local network A, B for internal communication of its devices. In this example, the private IP address spaces used in the two networks may potentially overlap with each other since such address spaces are often widely re-used in numerous local networks, in general.

Each gateway 100, 102 is equipped with a DNS function for handling DNS requests in the manner to be described below. It is assumed that users of network A have basically decided to enable communication with network B. A first step 1:1 illustrates schematically that a local NS (Name Server) record 100a is stored, or "updated", in the first gateway 100 and includes a domain name and an IP address of the second gateway 102. For example, users of the local networks A and B may have agreed to set up a VPN tunnel between the networks to enable "safe" communication of data packets between devices in the opposite networks over a public IP network such as the Internet. Step 1:1 would then be made in preparation for communication via the VPN tunnel.

At some point later, a user of device D1 wants to communicate with a user of device D2, and in this solution it is not necessary that the IP address of device D2 is known to the user/device D1. The user of D1 can simply input a hostname of the device D2 to trigger a DNS request from device D1. In a next step 1:2, device D1 thus sends the DNS request to the first gateway 100 referring to the hostname of device D2 that includes a first part identifying the second device and a second part with a domain name identifying the second gateway 102 and network B.

In a following step 1:3, gateway 100 checks the NS record 100a to determine the IP address of a so-called "primary DNS" of that domain name, in this case being the second gateway 102. This IP address was stored in the NS record 100a in step 1:1, and can thus be retrieved therefrom. Gateway 100 then sends another DNS request to the second gateway 102, using the determined IP address and referring to the hostname of device D2, in a further step 1:4. Gateway 12 then replies with a DNS response containing a private IP address that is currently valid for the second device D2, in a next step 1:5.

At this point, different options are possible depending on the situation. If the address spaces used in the two local networks A and B are potentially overlapping, there is a potential risk that the received IP address of device D2 may be confused with the locally used IP addresses of devices within network A. In that case, each gateway 100, 102 defines an IP address space for devices in the opposite local network, which has been selected as to avoid overlap with the IP address space used internally for its own devices. The private IP address of device D2 in the received DNS response is thus valid in network B but may not be unique in network A. In order to avoid address collisions in network A, gateway 100 therefore translates the IP address used in network B for device D2 into an IP address used in network A for device D2, in a further step 1:6, the latter address being taken from the IP address space previously defined by gateway 100 for devices in network B.

On the other hand, if the address spaces used in the two local networks A and B are known to be separate from each other, i.e. non-overlapping, the private IP address of device D2 in the received DNS response will be unique in network A as well and no translation will therefore be necessary. Step 1:6 can then be omitted.

Having received the IP address of device D2 in the DNS response of step 1:5, gateway 100 may also cache D2's address in a local storage or the like, as illustrated by a further optional step 1:7. In one embodiment, the DNS response from gateway 102 contains a time-out parameter which determines a validity duration for the current private IP address of device D2. That IP address may then be temporarily cached in the first gateway according to the time-out parameter.

Finally, gateway 100 forwards a DNS response to the device D1 in a step 1:8, containing the current private IP address of device D2, possibly translated according to the above. Thereby, device D1 is able to get across data packets to device D2, by using the received IP address of D2 as a destination address. If a VPN tunnel has been established for data packet communication between gateways 100 and 102, a public IP address has been assigned to each gateway which are used as destination and source addresses, respectively, in an external header which is added to each packet when communicated between the two networks A and B. The IP address of D2, either translated or as is, will then be used as destination address in an internal header of packets from D1 to D2.

Figure 1:
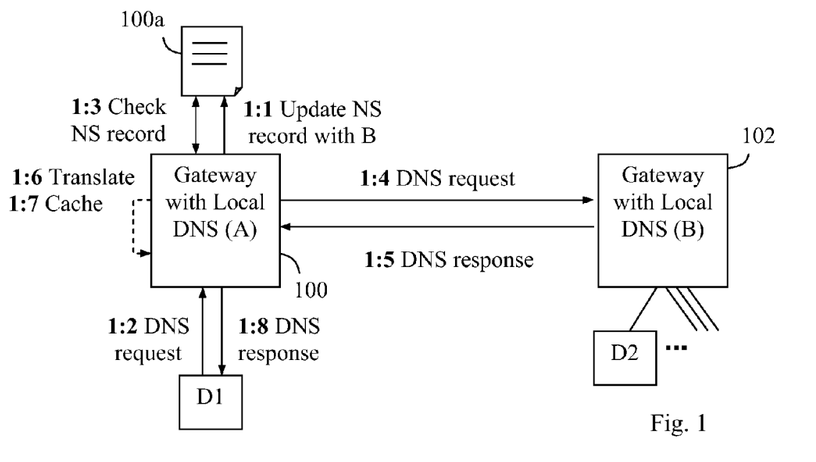
FIG. 1 is a schematic block diagram illustrating a scenario and procedure for enabling communication of data packets across two different local networks, according to some exemplary embodiments.
Figure 2:
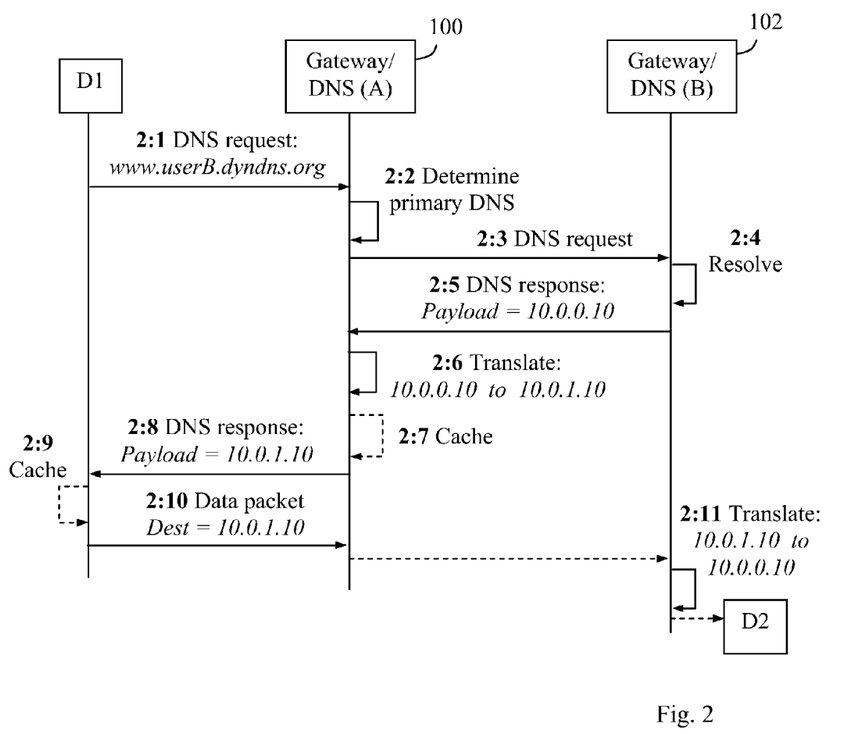
FIG. 2 is a signalling diagram illustrating how a useful IP address of a destination device in an opposite local network can be obtained, according to further exemplary embodiments.

FIG. 2 illustrates an example of message communication, by means of a signalling diagram, involving the first device D1, first gateway 100 and second gateway 102 according to the procedure shown in FIG. 1. It is assumed that the NS record of gateway 100 has been updated with domain name and IP address of gateway 102, as described for step 1:1 above. It is also assumed that the private IP address space 10.0.0.0/24 is used in network A for its own local devices within network A.

In a first shown step 2:1, gateway 100 receives the DNS request from device D1 referring to the hostname of device D2, in this case D2.networkB.dyndns.org. This hostname includes a first part "D2" identifying the target device D2 and a second part "networkB.dyndns.org" being a domain name identifying the second gateway 102 and network B. It should be noted that the first part may be freely configured in any manner, e.g. "Dx", "www" or "mail", which is agreed and predefined for the device in beforehand between the two networks A and B.

In a next step 2:2, gateway 100 determines the primary DNS by checking the NS record for the domain "networkB.dyndns.org", as described for step 1:3 above, and thereby obtains the IP address of gateway 102. Gateway 100 is now able to send a DNS request to the obtained IP address, i.e. to gateway 102, in a following step 2:3, referring to the above hostname. Upon receiving the DNS request, gateway 102 resolves the hostname according to a regular procedure, in a next step 2:4, to determine the private IP address 10.0.0.10 of device D2 which is valid in network B but not in network A in this example.

Gateway 102 then sends a DNS response to gateway 102, in a further step 2:5, containing the private IP address 10.0.0.10 of device D2 presented as payload in a DNS response packet. Since potentially overlapping address spaces are used in networks A and B, gateway 100 translates the received IP address 10.0.0.10, in a next step 2:6, into a modified private IP address 10.0.1.10 which has been assigned to the second device for use in the first network. The new translated address is separate from, i.e. non-overlapping with, the private IP address space used for the local devices within the first network.

In this example, the modified private IP address is an IPv4-based address where a unique number in a third octet has been allocated to represent the opposite network B, in this case "1". However, any addressing scheme may be used in network A for devices in network B and the invention is not limited in this respect. The modified IP address of device D2 may also be cached in the gateway 100, as indicated by an optional step 2:7.

Gateway then sends a DNS response to device D1, in a further step 2:8, containing the translated IP address 10.0.1.10 of device D2 presented as payload in a DNS response packet. Also device D1 may cache the received address in a local storage, as indicated by another optional step 2:9. Device D1 is now able to get across data packets to device D2, by using the received IP address of D2 as a destination address in an internal header of packets from D1 to D2, as shown in a further step 2:10. Gateway 102 will then translate the destination address from 10.0.1.10 to 10.0.0.10 which is valid in network B for device D2, as shown in a final step 2:11.

A procedure, performed by a first gateway in a first local network in which a first device is present, for enabling packet communication with a second device in an opposite second local network, will now be briefly described with reference to the flow chart in FIG. 3. As similar to the examples described above, the first gateway and a second gateway in the second local network are equipped with a DNS function.

In a first step 300, a local NS record in the first gateway is updated by storing a domain name and public IP address of the second gateway. In a next step 302, an outgoing DNS request is received from the first device, the DNS request referring to a hostname of the second device. In a following step 304, a public IP address of a primary DNS being the second gateway is determined by checking the local NS record. A DNS request is then sent to the second gateway, in a further step 306, to obtain a current private IP address used in the second network for the second device.

As mentioned for the above examples, it may be necessary to translate the obtained IP address of the second device if potentially overlapping address spaces are used in the two networks. Thus, in a step 308, the process may diverge depending on whether there is a risk that such overlapping address spaces are used in the first and second networks for their own devices. If it is known that they do not use such overlapping address spaces, the IP address of the second device obtained in step 306 can be used unambiguously in the first network, and the IP address could be forwarded in a DNS response to the first device as obtained, i.e. without translation, in a step 310.

Otherwise, the obtained IP address is translated into a modified private IP address which has been assigned to the second device for use in the first network, in a step 312. The translated and modified IP address is then finally forwarded in a DNS response to the first device in a final shown step 314.

Figure 3:
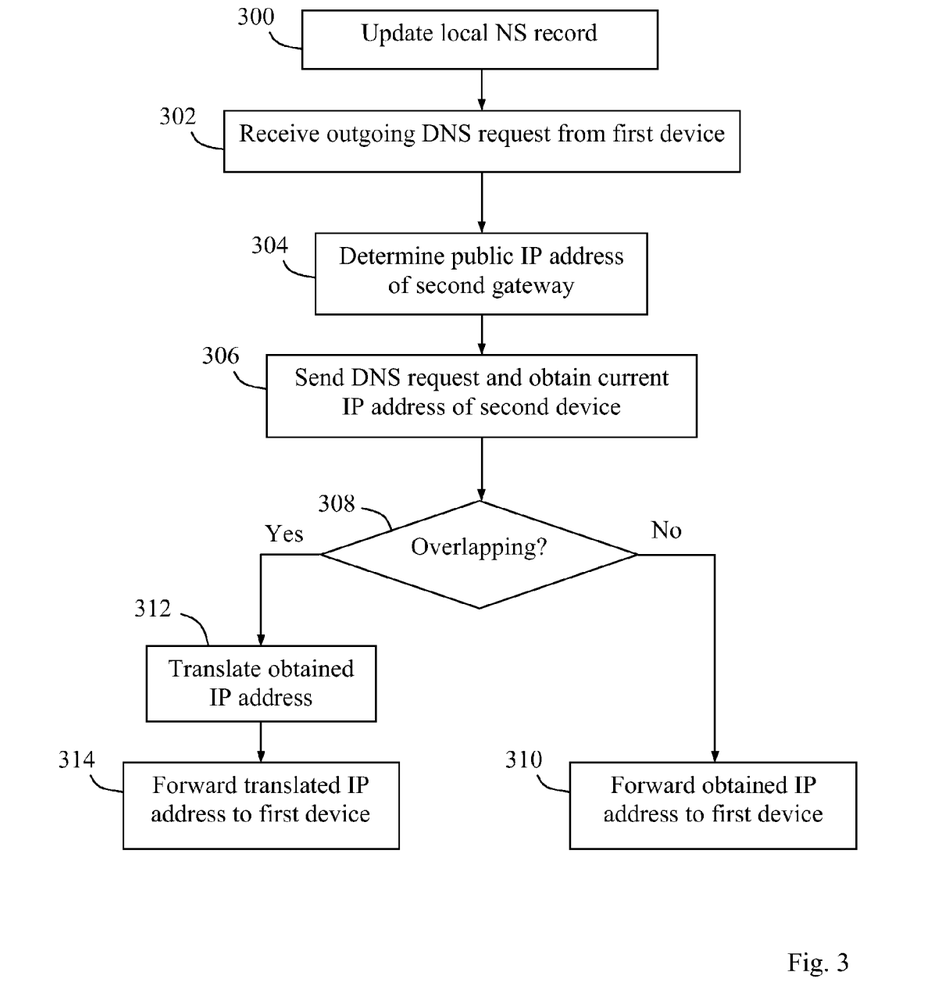
FIG. 3 is a flow chart illustrating a procedure for enabling communication of data packets between two devices in opposite local networks, according to yet another embodiment.

The exemplary procedure in FIG. 3 may be somewhat modified depending on the implementation. In a practical example, the obtained IP address may be translated into a modified private IP address according to the above, regardless of whether there is a risk or not that the two networks use overlapping address spaces. In that case, steps 308 and 310 could be omitted and steps 312 and 314 could be executed directly after step 306.

A first network gateway with functional units configured to basically perform the above-described steps and functions of gateway 100, will now be described in more detail with reference to the schematic block diagram in FIG. 4. In this example, the first gateway 400 serves a first local network and is capable of enabling communication of data packets between a first communications device in the first local network and a second communications device in a second local network. Private IP addresses are used for devices present in the first and second local networks.

The gateway 400 may basically be configured to act as the server 100 in FIGS. 1 and 2 and/or to execute the process shown in FIG. 3. In particular, the network gateway 400 is configured with a local DNS function for handling DNS requests basically in the manner described for the above examples.

The gateway 400 comprises a name server (NS) record manager 400a adapted to update a local name server record 400b with a domain name and an IP address of a second gateway 102 of the second network, each of the first and second gateways having a local DNS function. The gateway 400 also comprises an internal communication unit 400c adapted to receive from the first device (not shown) an outgoing DNS request referring to a hostname of the second device. The gateway 400 also comprises a DNS determining unit 400d adapted to determine the IP address of a primary DNS being the second gateway, from the local Name Server record based on a domain name in the hostname.

The gateway 400 further comprises an external communication unit 400e adapted to send a DNS request to the second gateway (not shown) using the determined IP address, and to obtain a current private IP address of the second device in a DNS response from the second gateway. The internal communication unit 400c is further adapted to forward a DNS response to the first device referring to the current private IP address of the second device.

The gateway 400 also comprises an IP address translating unit 400f adapted to translate the obtained private IP address to a modified private IP address used in the first network for the second device, if the private IP addresses used for devices in the first and second local networks are potentially overlapping and the obtained private IP address is used in the second network for the second device. In that case, the modified private IP address may have been defined for a VPN tunnel between the first and second networks and is separate from, i.e. non-overlapped with, an internal IP address space used in the first local network for devices in the first local network. Further, the modified private IP address may be retrieved from a translation table 400g created in the gateway 400 and containing at least a tunnel identity and a non-overlapping IP address space used in the first network for devices present the second network.

Figure 4:
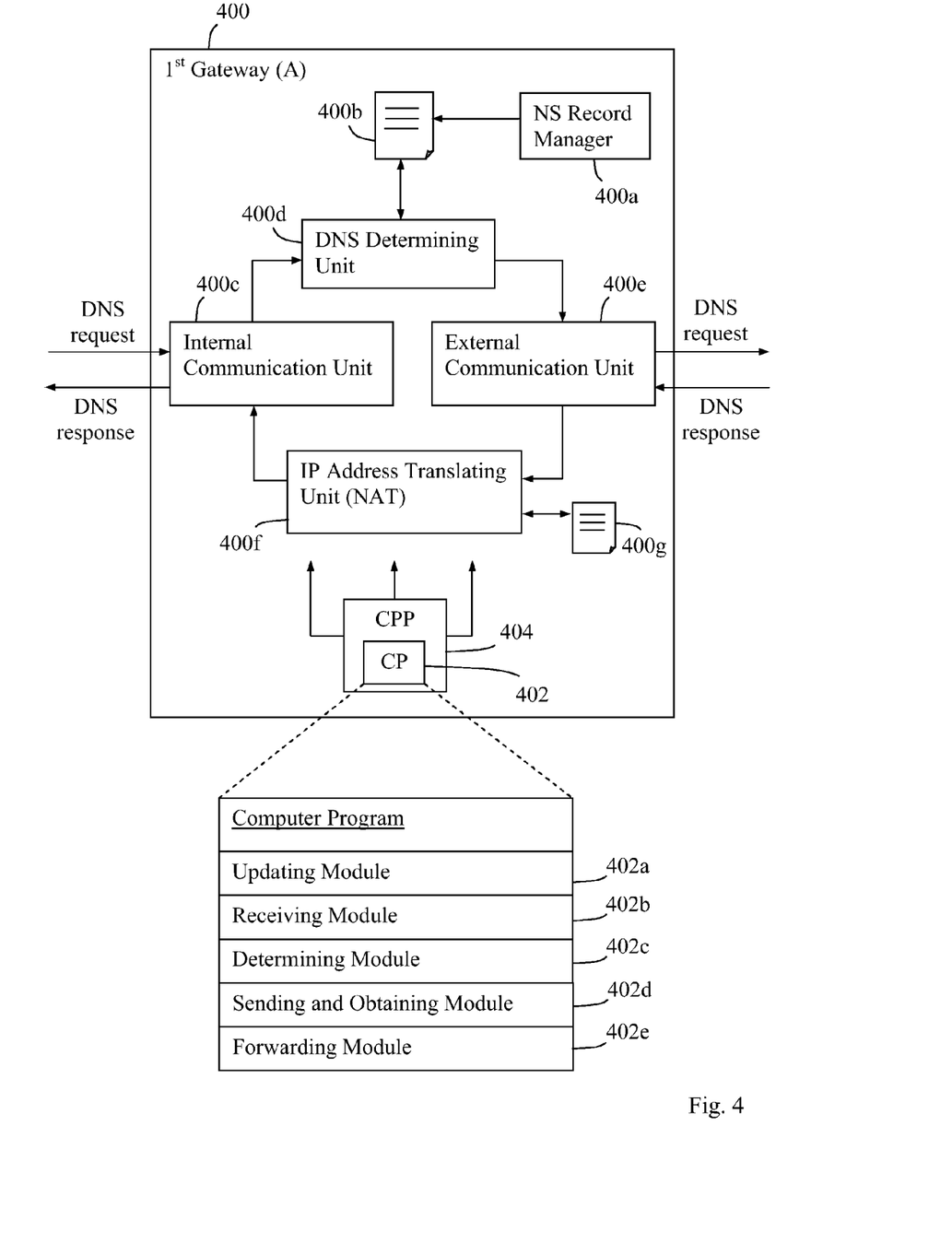
FIG. 4 is a schematic block diagram illustrating in more detail a network gateway equipped with a local DNS function, according to further exemplary embodiments.

As further illustrated in FIG. 4, the functional units described above can be implemented as program modules of a computer program 402 comprising code means which when run on the first gateway 400 causes the first gateway to perform the above-described functions and steps of the first gateway. In this embodiment, the computer program 402 is carried by a computer program product 404 comprising a computer readable medium on which the computer program is stored.

The program modules of the computer program 402 include:

- an updating module 402a capable of updating the local name server record 400b with a domain name and an IP address of the second gateway of the second network, each of the first and second gateways having a local DNS function,
- a receiving module 402b capable of receiving from the first device an outgoing DNS request referring to a hostname of the second device,
- a determining module 402c capable of determining the IP address of a primary DNS being the second gateway, from the local Name Server record based on a domain name in the hostname,
- a sending and obtaining module 402d capable of sending a DNS request to the second gateway, using the determined IP address, and obtain a current private IP address of the second device in a DNS response from the second gateway, and
- a forwarding module 402e capable of forwarding a DNS response to the first device, referring to the current private IP address of the second device.

The code means of the computer program 404 and computer program product 406 may also cause the first gateway to perform the following functions.

If the private IP addresses used for devices in the first and second local networks are potentially overlapping, and the obtained private IP address is used in the second network for the second device, the code means may cause the first gateway to translate the obtained private IP address to a modified private IP address used in the first network for the second device. The modified private IP address is within an address space defined for a VPN tunnel between the first and second networks and being separate from, i.e. non-overlapped with, an internal IP address space used in the first local network for devices in the first local network, The DNS response forwarded to the first device would then comprise the modified IP address.

If the DNS response from the second gateway further contains a time-out parameter which determines a validity duration for the current private IP address of the second device, the code means may cause the first gateway to temporarily cache the current private IP address of the second device in the first gateway according to the time-out parameter.

It should be noted that FIG. 4 merely illustrates various exemplary functional units and program modules in the gateway 400 in a logical sense, while the skilled person is free to implement the described functions in practice using any suitable software and hardware means. Thus, the invention is generally not limited to the shown structure of the gateway 400. For example, the computer program product may be a flash memory, ROM (Read-Only Memory) or an EEPROM (Electrically Erasable Programmable ROM), and the computer program modules described above could in alternative embodiments be distributed on different computer program products in the form of memories within the gateway 400.

The following benefits and advantages may be obtained by means of the above-described embodiments:

1) This solution allows users in local networks to have secure and private communication across the networks.
2) The DNS translation allows for a more user-friendly function not requiring knowledge of the current IP address of the opposite device.
3) All private IP-addresses are made unique when communicating data packets between the networks.
4) The translation in the payload of the DNS responses allows for better interworking between local networks having established a VPN tunnel.
5) The solution is scalable since each gateway is responsible for the tunneling and address translation functionalities.
6) The local DNS functionality does not impact or interfere with the existing global DNS functions.
7) The solution can also be used to support multi country solutions for mobile networks.

While the invention has been described with reference to specific exemplary embodiments, the description is generally only intended to illustrate the inventive concept and should not be taken as limiting the scope of the invention. The invention is defined by the appended claims.

The invention claimed is:

1. A method of enabling communication of data packets between a first communications device in a first local network and a second communications device in a second local network, wherein private IP addresses are used for devices present in the first and second local networks which are potentially overlapping in the first and second local networks, comprising the following steps executed in a first gateway of the first network:

updating a Local Name Server record, in the first gateway, with a domain name and an IP address of a second gateway of the second network, each of said first and second gateways having a local DNS function;

receiving from the first communications device an outgoing DNS request referring to a hostname of the second communications device;

determining the IP address of a primary DNS being the second gateway, from the local Name Server record based on a domain name in the hostname;

sending a DNS request to the second gateway, using the determined IP address;

receiving a DNS response from the second gateway and obtaining a current private IP address of the second communications device from the DNS response, wherein the current private IP address is used in the second network for the second communications device;

translating the current private IP address of the second communications device to a modified private IP address used in the first local network for the second communications device, wherein the modified private IP address is within an address space defined for a VPN tunnel between the first and second local networks and is separate from an internal IP address space used in the first local network for devices in the first local network;

forwarding the DNS response to the first communications device, referring to the modified private IP address of the second communications device;

receiving a data packet from the first communications device, said data packet comprising the modified private IP address of the second communications device as destination address; and transmitting to said second gateway said data packet without translating the destination address such that translating the current private IP address of the second communications device to the modified private IP address is performed by the first gateway and converting the modified private IP address back to the current private IP address of the second device is performed by the second gateway.

2. The method according to claim 1, wherein said modified private IP address is an IPv4-based address where a unique number in a second or third octet is allocated to represent the second local network.

3. The method according to claim 2, wherein the DNS response from the second gateway further includes a timeout parameter which determines a validity duration for the current private IP address of the second communications device.

4. The method according to claim 3, wherein the current private IP address of the second communications device is temporarily cached in the first gateway according to the timeout parameter.

5. The method according to claim 1, wherein the hostname includes a first part identifying the second communications device and a second part identifying said domain name.

6. The method according to claim 1, wherein the VPN tunnel is established for data packet communication between the first and second gateways, and a public IP address has been assigned to each gateway.

7. An apparatus in a first gateway serving a first local network, enabling communication of data packets between a first communications device in the first local network and a second communications device in a second local network, wherein private IP addresses are used for devices present in the first and second local networks which are potentially overlapping in the first and second local networks, said apparatus comprising:
- a memory;
- an internal communication unit;
- an external communication unit; and
- a processor, said processor being coupled to the memory and further comprising a Name Server record manager circuit, a DNS determining circuit, and an IP address translating circuit;

wherein:
- said Name Server record manager circuit is configured to update a local Name Server record with a domain name and an IP address of a second gateway of the second network, each of said first and second gateways having a local DNS function;
- said internal communication unit is configured to receive from the first communications device an outgoing DNS request referring to a hostname of the second communications device;
- said DNS determining circuit is configured to determine the IP address of a primary DNS being the second gateway, from the local Name Server record based on a domain name in said hostname;
- said external communication unit is configured to send a DNS request to the second gateway using the determined IP address, and to obtain a current private IP address of the second communications device in a DNS response from the second gateway, wherein the current private IP address is used in the second network for the second communications device;
- said IP address translating circuit is configured to translate the current private IP address to a modified private IP address used in the first network for the second communications device, wherein the modified private IP address is within an address space defined for a VPN tunnel between the first and second networks and separate from an internal IP address space used in the first local network for devices in the first local network;
- wherein the internal communication unit is further configured to forward the DNS response to the first communications device referring to the modified private IP address of the second communications device, and to receive a data packet from the first communications device containing the modified IP address of the second communications device as a destination address; and
- wherein the external communication unit is further configured to transmit the data packet to the second gateway without translating the destination address such that translating the current private IP address of the second communications device to the modified private IP address is performed by the first gateway and converting the modified private IP address back to the current private IP address of the second communications device is performed by the second gateway.

8. The apparatus according to claim 7, wherein said modified private IP address is an IPv4-based address where a unique number in a second or third octet is allocated to represent the second local network.

9. The apparatus according to claim 7, wherein the DNS response from the second gateway further contains a timeout parameter which determines a validity duration for the current private IP address of the second communications device.

10. The apparatus according to claim 9, further configured to temporarily cache the current private IP address according to the timeout parameter.

11. The apparatus according to claim 7, wherein the hostname includes a first part identifying the second communications device and a second part identifying said domain name.

12. The apparatus according to claim 7, wherein the VPN tunnel is established for data packet communication between the first and second gateways, and a public IP address is assigned to each gateway.

13. A non-transitory computer-readable medium storing a computer program configured for a first gateway serving a first local network, the computer program enabling communication of data packets between a first communications device in the first local network and a second communications device in a second local network, wherein private IP addresses are used for devices present in the first and second local networks which are potentially overlapping in the first and second local networks, and wherein the computer program, when executed, causes the first gateway to:
- update a local Name Server record with a domain name and an IP address of a second gateway of the second network, each of said first and second gateways having a local DNS function;
- receive from the first communications device an outgoing DNS request referring to a hostname of the second communications device;
- determine the IP address of a primary DNS being the second gateway, from the local Name Server record based on a domain name in said hostname;
- send a DNS request to the second gateway, using the determined IP address;
- obtain a current private IP address of the second communications device in a DNS response from the second gateway, wherein the current private IP address is used in the second network for the second communications device;
- translate the current private IP address to a modified private IP address used in the first network for the second communications device, wherein the modified private IP address is within an address space defined for a VPN tunnel between the first and second networks and is separate from an internal IP address space used in the first local network for devices in the first local network;
- forward the DNS response to the first communications device, referring to the modified private IP address of the second communications device;

receive a data packet from the first communications device, said data packet comprising the modified private IP address of the second communications device as destination address; and transmit transmitting to said second gateway said data packet without translating the destination address such that translating the current private IP address of the second communications device to the modified private IP address is performed by the first gateway and converting the modified private IP address back to the current private IP address of the second communications device is performed by the second gateway.

\* \* \* \* \*

UNITED STATES PATENT AND TRADEMARK OFFICE
CERTIFICATE OF CORRECTION

PATENT NO. : 8,559,448 B2  
APPLICATION NO. : 12/922946  
DATED : October 15, 2013  
INVENTOR(S) : Kölhi et al.

Page 1 of 1

It is certified that error appears in the above-identified patent and that said Letters Patent is hereby corrected as shown below:

On the Title Page

In Item (12), under "United States Patent", in Column 1, Line 1, delete "Kolhi," and insert -- Kölhi, --, therefor.

In Item (75), under "Inventors", in Column 1, Line 1, delete "Johan Kolhi," and insert -- Johan Kölhi, --, therefor.

In Item (75), under "Inventors", in Column 1, Line 3, delete "Jarfalla" and insert -- Järfälla --, therefor.

In Item (73), under "Assignee", in Column 1, Line 2, delete "Stockholm" and insert -- (publ), Stockholm --, therefor.

In Item (57), under "ABSTRACT", in Column 2, Line 3, delete "(B). where" and insert -- "(B), where --, therefor.

In the Claims

In Column 13, Line 5, in Claim 13, delete "transmit transmitting" and insert -- transmit --, therefor.

Signed and Sealed this  
Twenty-fifth Day of February, 2014

Michelle K. Lee  
*Deputy Director of the United States Patent and Trademark Office*